United States Patent
Arndt et al.

(10) Patent No.: US 8,381,005 B2
(45) Date of Patent: Feb. 19, 2013

(54) PROCESSOR AND MEMORY FOLDING FOR MANAGING POWER CONSUMPTION IN INFORMATION PROCESSING SYSTEMS

(75) Inventors: Richard L. Arndt, Austin, TX (US); Naresh Nayar, Rochester, MN (US); Freeman L. Rawson, III, Austin, TX (US); Randal C. Swanberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 487 days.

(21) Appl. No.: 12/642,098

(22) Filed: Dec. 18, 2009

(65) Prior Publication Data

US 2011/0154083 A1    Jun. 23, 2011

(51) Int. Cl.
*G06F 1/00* (2006.01)
(52) U.S. Cl. .................................... 713/323
(58) Field of Classification Search .............. 713/323
See application file for complete search history.

(56) References Cited

U.S. PATENT DOCUMENTS

| | | | |
|---|---|---|---|
| 6,182,201 B1 * | 1/2001 | Arimilli et al. | 711/202 |
| 2004/0193829 A1 | 9/2004 | Woo et al. | |
| 2007/0106860 A1 | 5/2007 | Foster, Sr. et al. | |
| 2008/0172565 A1 | 7/2008 | Chu et al. | |
| 2009/0007120 A1 | 1/2009 | Fenger et al. | |

OTHER PUBLICATIONS

"Preocessor and Memory folding for energy managemnet" By Plante, Apr. 1, 2005, 3-pages.*
"Preocessor and Memory folding for energy managemnet" By Amit Sinha and Ananta P. Chandrakasan, Dec. 31, 2001, 3-pages.*
Le Cai et al., Joint Power Management of Memory and Disk Under Performance Constraints, IEEE Transactions on Computer-Aided Design of Integrated Circuits and Systems, vol. 25, No. 12, Dec. 2006.
U.S. Appl. No. 11/096,864, filed Oct. 5, 2006, Plante.
"Processor and Memory Folding for Energy Mgmt" By Plante Apr. 1, 2005, 3 Pages.
"Processor and Memory Folding for Energy Mgmt" By Amit Sinha and Ananta P. Chandrakasan, Dec. 31, 2001, 3 Pages.

* cited by examiner

*Primary Examiner* — Mohammed Rehman
(74) *Attorney, Agent, or Firm* — Hamilton & Terrile, LLP; Stephen A. Terrile

(57) ABSTRACT

A method, system and computer-usable medium are disclosed for managing power consumption in information processing systems. Processing resources are successively folded, allowing them to be placed into deeper and deeper power saving states while maintaining the ability to respond to new processing loads without exposing the latency of the deeper power saving states as they are unfolded. Before a deeper power saving state can be used, there must be sufficient processing resources in the prior power saving state to mask the latency of bringing a processing resource out of the deeper power saving state.

20 Claims, 5 Drawing Sheets

PROCESSOR AND MEMORY FOLDING FOR MANAGING POWER CONSUMPTION IN INFORMATION PROCESSING SYSTEMS

BACKGROUND OF THE INVENTION

1. Field of the Invention

Embodiments of the disclosure relate in general to the field of computers and similar technologies, and in particular to software utilized in this field. Still more particularly, it relates to managing power consumption in information processing systems.

2. Description of the Related Art

The costs associated with the energy required to power and cool today's information technology (IT) infrastructure continue to escalate. As the number of information processing systems continue to grow, these costs have become a significant issue, prohibiting business growth and reducing profit margins. At the same time, increases in energy consumption are placing unprecedented demands on a valuable and increasingly scarce resource.

One known approach to conserving energy within an IT infrastructure is processor folding. This technique is implemented by an operating system (OS), or a Hypervisor, to consolidate active processing loads to use the fewest possible number of processor cores. As processing loads are evacuated from a processor, they become idle, allowing them to enter lower power usage states, often referred to as a sleep state. However, one issue encountered with processor folding is the latency incurred when needing to unfold a processor, that is, revive it to recover from a low power state in order to accommodate either new processing loads or spikes in existing processing loads. As a result, the depth of a power saving state that can be used is limited and therefore the potential power savings that can be realized is reduced. Furthermore, current folding approaches have not been applied to other processing resources, such as memory and storage devices.

BRIEF SUMMARY OF THE INVENTION

The present invention includes, but is not limited to, a method, system and computer-usable medium for managing power consumption in information processing systems. In various embodiments, processing resources are successively folded, allowing them to be placed into deeper and deeper power saving states while maintaining the ability to respond to new processing loads without exposing the latency of the deeper power saving states as they are unfolded. In these and other embodiments, before a deeper power saving state can be used, there must be sufficient processing resources in the prior power saving state to mask the latency of bringing a processing resource out of the deeper power saving state.

In various embodiments, processing loads assigned to a plurality of processing resources are monitored. If processing resources are available for processing load consolidation, then processing loads are reassigned to available processing resources. Idle processing resources are then placed in a first sleep state, comprising a first power consumption level and a first revival latency interval. Then, the sum of the respective revival latency intervals associated with all processing resources currently in the first sleep state is determined. If the sum exceeds the revival latency interval of a second sleep state, comprising a lower power consumption level then a processing resource currently in the first sleep state is selected and placed into the second sleep state.

If active processing resources do not have sufficient capacity to accommodate a new processing load, and a processing resource in a first sleep state is available, then it is placed into an active state. The new processing load is then assigned to the revived, or newly-active, processing resource. A determination is then made if other processing resources are in a second sleep state, comprising a second power consumption level and a second revival latency interval. If so, then the sum of the respective revival latency intervals associated with all processing resources currently in the first sleep state is determined and compared to the second revival latency interval. If the sum exceeds the second revival latency interval, then a processing resource currently in the second sleep state is selected and placed into the first sleep state. The above, as well as additional purposes, features, and advantages of the present invention will become apparent in the following detailed written description.

BRIEF DESCRIPTION OF THE DRAWINGS

Selected embodiments of the present invention may be understood, and its numerous objects, features and advantages obtained, when the following detailed description is considered in conjunction with the following drawings, in which.

DETAILED DESCRIPTION

Figure 1:
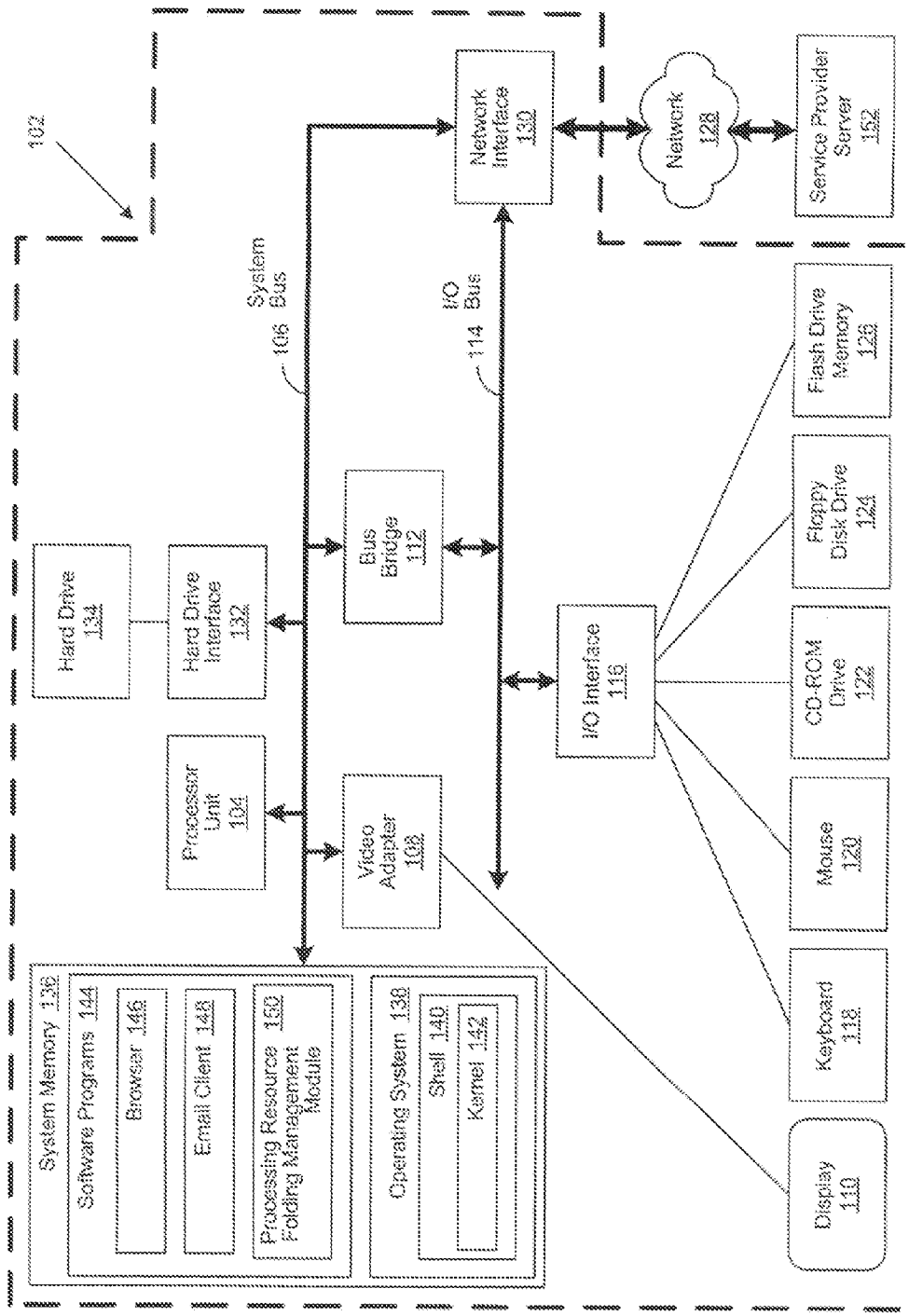
FIG. 1 depicts an exemplary client computer in which the present invention may be implemented.

A method, system and computer-usable medium are disclosed for managing power consumption in information processing systems. As will be appreciated by one skilled in the art, the present invention may be embodied as a method, system, or computer program product. Accordingly, embodiments of the invention may be implemented entirely in hardware, entirely in software (including firmware, resident software, micro-code, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a floppy disk drive 124, and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN). Using network 128, client computer 102 is able to use the present invention to access service provider server 152.

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a processing resource folding management module 150. The processing resource folding management module 150 includes code for implementing the processes described in FIGS. 2-4 described hereinbelow. In one embodiment, client computer 102 is able to download the processing resource folding management module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
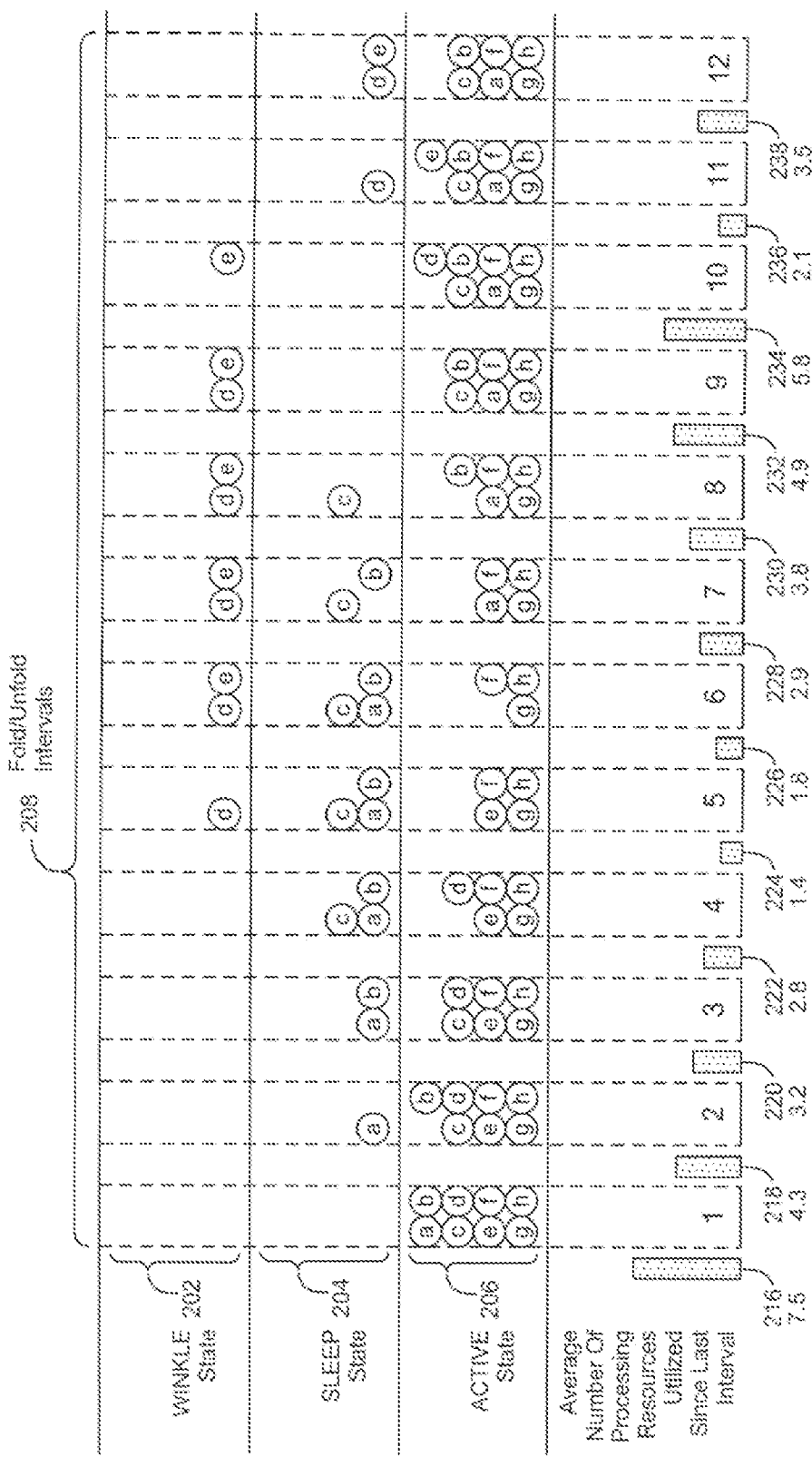
FIG. 2 is a generalized block diagram of the operation of a processing resource folding management module as implemented in accordance with an embodiment of the invention.

FIG. 2 is a generalized block diagram of the operation of a processing resource folding management module as implemented in accordance with an embodiment of the invention. In various embodiments, processing resources are successively folded, allowing them to be placed into deeper and deeper power saving states while maintaining the ability to respond to new processing loads without exposing the latency of the deeper power saving states as they are unfolded. In this embodiment, processing resources 'a'-'h' are managed by a processing resource folding management module to operate in an 'ACTIVE' 206, 'SLEEP' 204, or 'WINKLE' 202 operational state. In various embodiments, the processing resources 'a'-'h' comprise processors operable to perform processing operations.

In various embodiments, the processing resources comprise memory units, such as dual inline memory modules (DIMMs). In these and other embodiments, active, in-use memory is folded (i.e., consolidated or compacted) onto a fewer or specific DIMM ranks such that other DIMM ranks can be placed into lower power states or powered off completely. In one embodiment, memory address ranges are assigned to corresponding memory power domains for power management. In another embodiment, the memory power domains are likewise associated with other processing resources, such as a system processor core. As an example, memory folding may be performed as a function of processor folding. To further the example, a memory-folding operation may be configured to maintain 4 GB of active memory per active processor core. Then, as individual processor cores are folded, associated DIMM ranks can likewise be folded to maintain a ratio of 4 GB active memory per processor core.

The folded DIMM ranks, associated with a targeted memory power domain, can then be placed into a lower power state or even be powered-off completely. One approach to accomplishing such memory folding is to have the OS perform transparent memory page migrations, which builds upon existing dynamic memory removal support, to compact the in-use memory to a smaller number of active DIMM ranks. The folded memory pages are placed into a new folded state within the OS memory management states, which similar to a folded processor core, represents a resource still owned by the OS, but purposefully dormant or inactive. When a decision is made to unfold an associated processor core, folded memory pages are reactivated and placed back onto free lists for allocation and to maintain a predetermined memory-to-processor-core relationship.

In one embodiment, the OS maintains lists of free memory in order to have pages ready for allocation on demand. Various memory control operations determine how aggressively dormant pages are searched out and reclaimed to be put on a free memory list. Based on various power savings modes and processing load demands, memory recovery operations may be modified to harvest additional memory pages to make them available. Likewise, free-page memory lists may be organized for affinity per memory pool, for page size, for cache coloring, or by memory power domain. Accordingly, based on a predetermined power savings mode or load-based measurement approach, pages of a particular memory domain may be reclaimed and then placed on its corresponding free memory list.

In another embodiment, the contents of one or more memory domains are evacuated to other memory domains and the OS identifies their corresponding memory power domain. The OS then either leaves the evacuated memory pages on a memory domain free list until they need to be reactivated, or they may be placed into a folded page state, thereby preventing them from being placed on a memory free list. In these and other embodiments, the processing resources may comprise individual or combinations the aforementioned and other processing resources, such as nonvolatile storage devices, power control units, and information processing peripherals. It will be appreciated by those of skill in the art that many such processing resources exist and that the foregoing is not intended to limit the spirit, scope, or intent of the disclosure.

Each of the 'ACTIVE' 206, 'SLEEP' 204, and 'WINKLE' 202 operational states has a corresponding power consumption level, which refers to the amount of power used by the processing resource while in each state. As an example, a processing resource 'a'-'h' operating in an 'ACTIVE' 206 state may completely consume its allocated power budget. However, the same processing resource 'a'-'h' operating in a 'SLEEP' 204 state may consume a reduced amount of power, and when acting in a 'WINKLE' 202 state, even less. However, when a processing resource is operating in a 'SLEEP' 204 or 'WINKLE' 202 state it has a corresponding fold/unfold interval '1'-'12' 208, which refers to the amount of time required for it to move from an operational state consuming less power to an operational state consuming more power. As an example, processing resources 'a'-'h' operating in a 'SLEEP' 204 state have one corresponding revival latency interval, but when operating in a 'WINKLE' 202 state they may have a longer revival latency interval.

In various embodiments, the number of operating states is determined by the number of different power states a processing resource is capable of supporting. As and example, each incremental power saving state supported by a processing resource may have an increase in potential power savings with a corresponding incremental revival latency for coming out of the deeper power saving state. To further the example, a processing resource may support NAP, 'SLEEP' 204, and 'WINKLE' 202 operating states, with the NAP state providing minimal power savings with single millisecond revival latency. Likewise, the 'SLEEP' 204 state may provide modest power savings with 10's of millisecond revival latency. The 'WINKLE' 202 state may likewise provide maximum power savings at the cost of seconds of revival latency.

In these and other embodiments, before a deeper power saving state can be used, there must be sufficient processing resources in the prior power saving state to mask the latency of bringing a processing resource out of the deeper power saving state. For example, processing resource folding and unfolding decisions could be made in 1 second fold/unfold intervals. Therefore, if a processing resource in a 'WINKLE' 202 state requires 3 seconds to revive, then before a folding operation will allow a processing resource to enter a 'WINKLE' 202 state, there must be at least 3 processing resources currently in a 'SLEEP' 204 state. This ensures that if a processing resource in a 'WINKLE' 202 state needs to be revived, then over the next 3 fold/unfold intervals, there will be at least 1 processing resource available to activate within a single fold/unfold interval, and by the time the fourth interval is reached, a processing resource in a 'WINKLE' 202 state will be available to be placed in an 'ACTIVE' 206 state.

In various embodiments, processing loads assigned to a plurality of processing resources 'a'-'h' operating in an 'ACTIVE' 206 state are monitored for processing load consolidation. As illustrated in FIG. 2, all processing resources 'a'-'h' are operating in an 'ACTIVE' state with average number 216 of 7.5 processing resources utilized since the last revival latency period. However, if processing resources 'a'-'h' are not operating at capacity, then processing loads from one processing resource may be reassigned to other processing resources with available processing capacity. As likewise illustrated in FIG. 2, between fold/unfold interval '1' and '2' the average number 218 of only 4.3 processing resources of the currently ACTIVE 8 processing resources 'a' through 'h' were utilized. As a result, folding operations are performed to reassign processing loads in fold/unfold interval '2' and to place processing resource 'a' in a 'SLEEP' 204 state. Between fold/unfold interval '2' and '3', an average number 220 of 3.2 processing resources were utilized of the ACTIVE 7 processing resources 'b' through 'h'. As a result, processing loads have been reassigned in fold/unfold interval '3' and processing resource 'b' has been placed in a 'SLEEP' 204 state. At fold/unfold interval '4', an average number 222 of 2.8 processing resources of the 6 ACTIVE processing resources 'c' through 'h' were utilized and as a result, processing resource 'c' has likewise been placed in a 'SLEEP' 204 state. The reassignment process is continued in fold/unfold interval '5', where an average number 224 of 1.4 of the 5 'ACTIVE' processing resources 'd' through 'h' were utilized during the interval. As a result, another decision to fold a resource is made. However, the sum of the revival latency intervals associated with processing resources 'a', 'b', and 'c' (e.g., 3 seconds) in the 'SLEEP' state 204 is compared to the revival latency interval (e.g., 3 seconds) associated with a processing resource 'a'-'h' operating in a 'WINKLE' state 202. If the sum is equal or greater than the 'WINKLE' latency, then processing resource 'd' is placed in a 'WINKLE' state 202. Further processing load analysis operations are performed in fold/unfold interval '6' where an average number 226 of 1.8 of the 4 'ACTIVE' processing resources 'e' through 'h' were utilized, resulting in another fold decision. Accordingly, processing resource 'e' is likewise placed into a 'WINKLE' 202 state since processing resources 'a', 'b', and 'c' are already in a 'SLEEP' state to ensure there are sufficient resources in a 'SLEEP' state to allow unfolding a processing resource at each fold/unfold interval while still providing time for a processing resource in a WINKLE state to revive.

However, at fold/unfold interval '7' an average number 228 of 2.9 of the remaining 3 'ACTIVE' processing resources 'g', and 'h' are utilized, resulting in a decision to unfold a processing resource. Accordingly, processing resource 'a' is placed into an 'ACTIVE' 206 state. As a result, only 2 processing resources 'c' and 'b' remain in the 'SLEEP' state. Since the sum of the revival intervals of the two processing resources is no longer equal or greater than the revival latency of a processing resource in a 'WINKLE' state, a processing resources 'd' is chosen to revive from a 'WINKLE' state to an 'Active' state. As a result, processing resource 'd' is available by fold/unfold interval '10' (e.g., 3 seconds for processing resource 'd' to revive from a 'WINKLE' state). At fold/unfold interval '8', an average number 230 of 3.8 of the 4 'ACTIVE' processing resources 'a', 'f', 'g', and 'h' are utilized. As a result, processing resource 'b' is selected to be moved from a 'SLEEP' state to an 'ACTIVE' state. Just as at fold/unfold interval '7', the sum of remaining resources in a 'SLEEP' state is not equal or greater than the latency to revive a processing resource in a 'WINKLE' state. Accordingly, processing resource 'e' is chosen to be revived from a 'WINKLE' state so it will be available by fold/unfold interval '11'. In fold/unfold interval '9', an average number 232 of 4.9 of the 5 'ACTIVE' processing resources 'a', 'b', 'g', and 'h' are utilized, resulting in processing resource 'c' being selected to be moved from a 'SLEEP' state to an 'ACTIVE' state. At this point, there are no more processing resources are in a 'SLEEP' state and there are no more processing resources in a 'WINKLE' state that haven't already begun revival.

At fold/unfold interval '10', an average number 234 of 5.8 of the 6 'ACTIVE' processing resources 'a', 'b', 'c', 'g', and 'h' are utilized and there are no additional processing resources available in a 'SLEEP' 204 state. However, processing resource 'd' has now completed its revival from its 'WINKLE' state which was initiated at fold/unfold interval '7' and has entered an 'ACTIVE' 206 state. At fold/unfold interval '11', an average number 236 of 2.1 of the 7 'ACTIVE' processing resources 'a'-'d' and 'f'-'h' are utilized. As a result, processing resource 'd' is selected to be placed into a 'SLEEP' 204 state. Also at fold/unfold interval '11', processing resource 'e' has now completed its revival from its 'WINKLE' state which was initiated at fold/unfold interval '8' and enters an 'ACTIVE' state. Then, in fold/unfold interval '12', an average number 238 of 3.5 of the 7 'ACTIVE' processing resources 'a'-'d' and 'f'-'h' are utilized. As a result, processing resource 'e' is selected to be placed in a 'SLEEP' 204 state. It will be appreciated by those of skill in the art that many such embodiments are possible and the foregoing is not intended to limit the spirit, scope, or intent of the disclosure.

Figure 3:
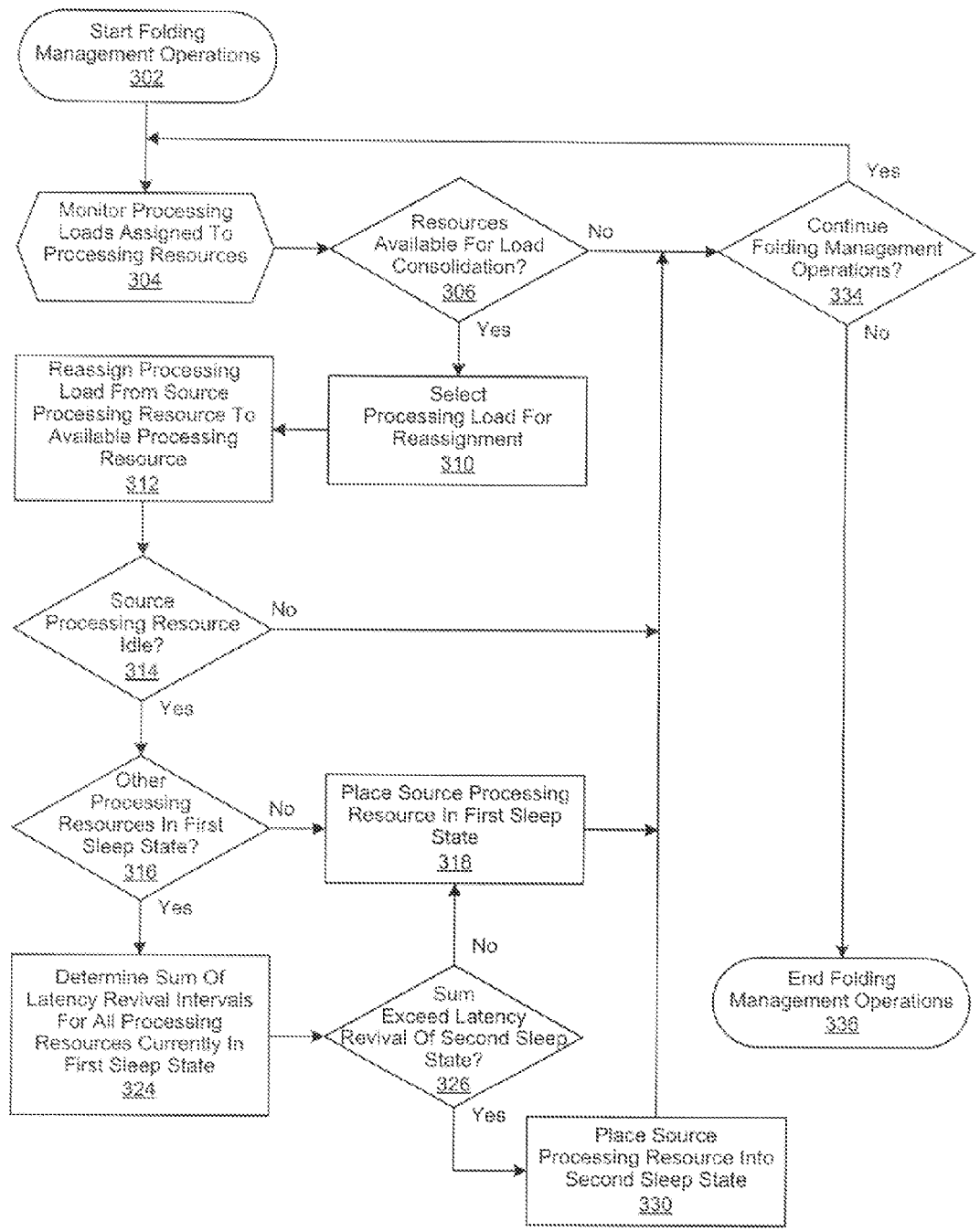
FIG. 3 is a simplified flowchart of the operation of a processing resource folding management module as implemented in accordance with an embodiment of the invention for folding operations.

FIG. 3 is a simplified flowchart of the operation of a processing resource folding management module as implemented in accordance with an embodiment of the invention for folding operations. In this embodiment, folding management operations are begun in step 302, followed by the monitoring of processing loads assigned to a plurality of processing resources in step 304. A determination is then made in step 306 whether processing resources are available for processing load consolidation. As an example, four processor cores may be in an active state, yet each is running at 30% capacity. Accordingly, processing loads from two of the active processor cores may be reassigned to the other two processor cores. As a result, two processor cores will be in an idle state after the processing load reassignment and two processor cores will be running at 60% capacity. Likewise, DIMM memory modules associated with the processing loads may be similarly managed.

If it is determined in step 306 that processing resources are not available for processing load consolidation, then a determination is made in step 334 whether to continue folding management operations. If so, then the process is continued, proceeding with step 304. Otherwise folding management operations are ended in step 336. However, if it is determined in step 306 that processing resources are available for processing load consolidation, then a processing load is selected in step 310 and then reassigned to an available processing resource in step 312. A determination is then made in step 314 whether the source processing resource is in an idle state. If not, then the process is continued, proceeding with step 334. Otherwise, a determination is then made in step 316 whether other processing resources are in the first sleep state. If not, then the source processing resource is placed in a first sleep state, comprising a first power consumption level and a first revival latency interval in step 318 and the process is continued, proceeding with step 334. Otherwise, the sum of the respective revival latency intervals associated with all processing resources currently in the first sleep state is determined in step 324. A determination is then made in step 326 whether the sum exceeds the revival latency interval of a second sleep state, comprising a lower power consumption level. If not, then the process is continued, proceeding with step 318. Otherwise, the source processing resource is placed into the second sleep state in step 330 and the process is then continued, proceeding with step 334.

Figure 4A:
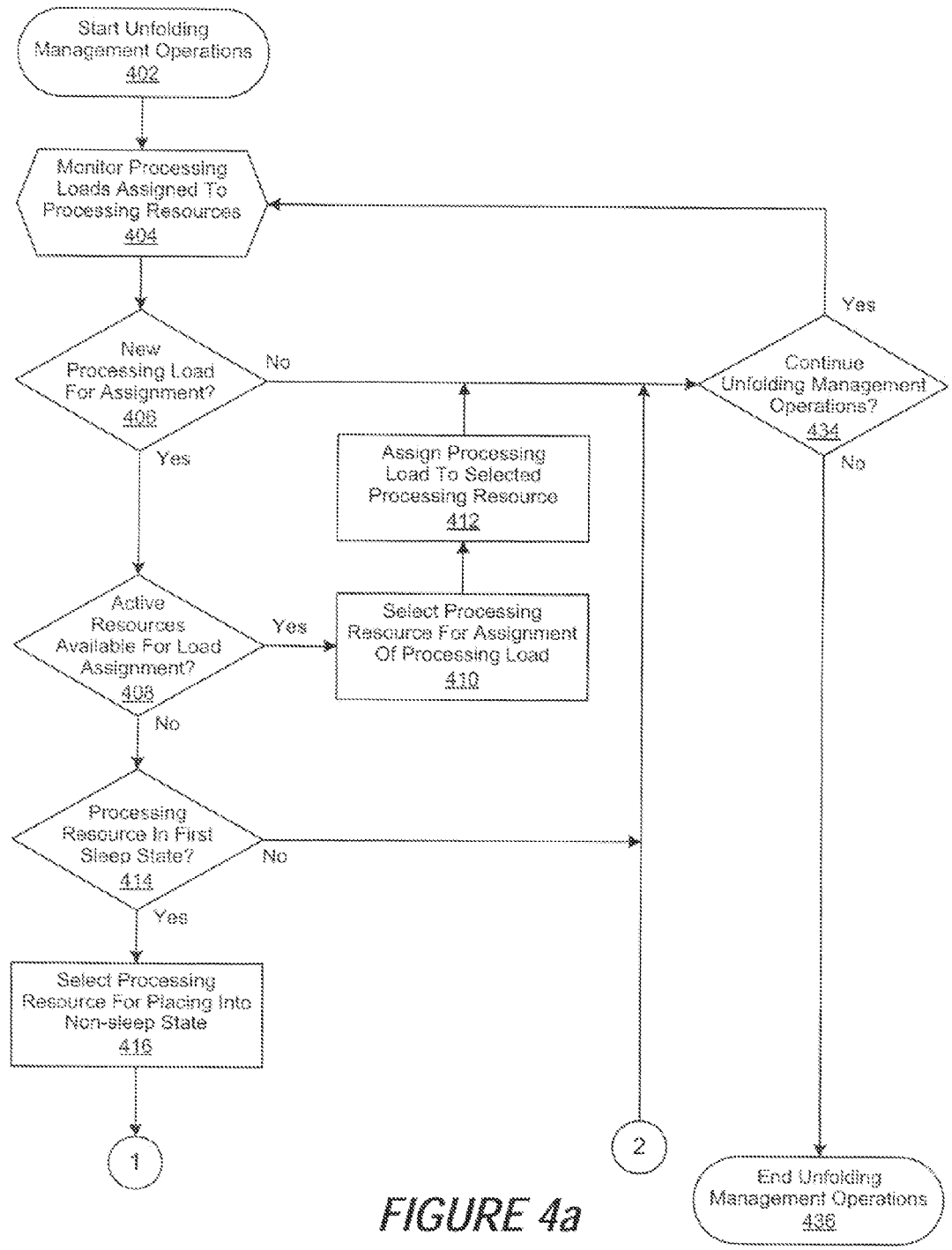
FIG. 4 is a simplified flowchart of the operation of a processing resource folding management module as implemented in accordance with an embodiment of the invention for unfolding operations.
Figure 4B:
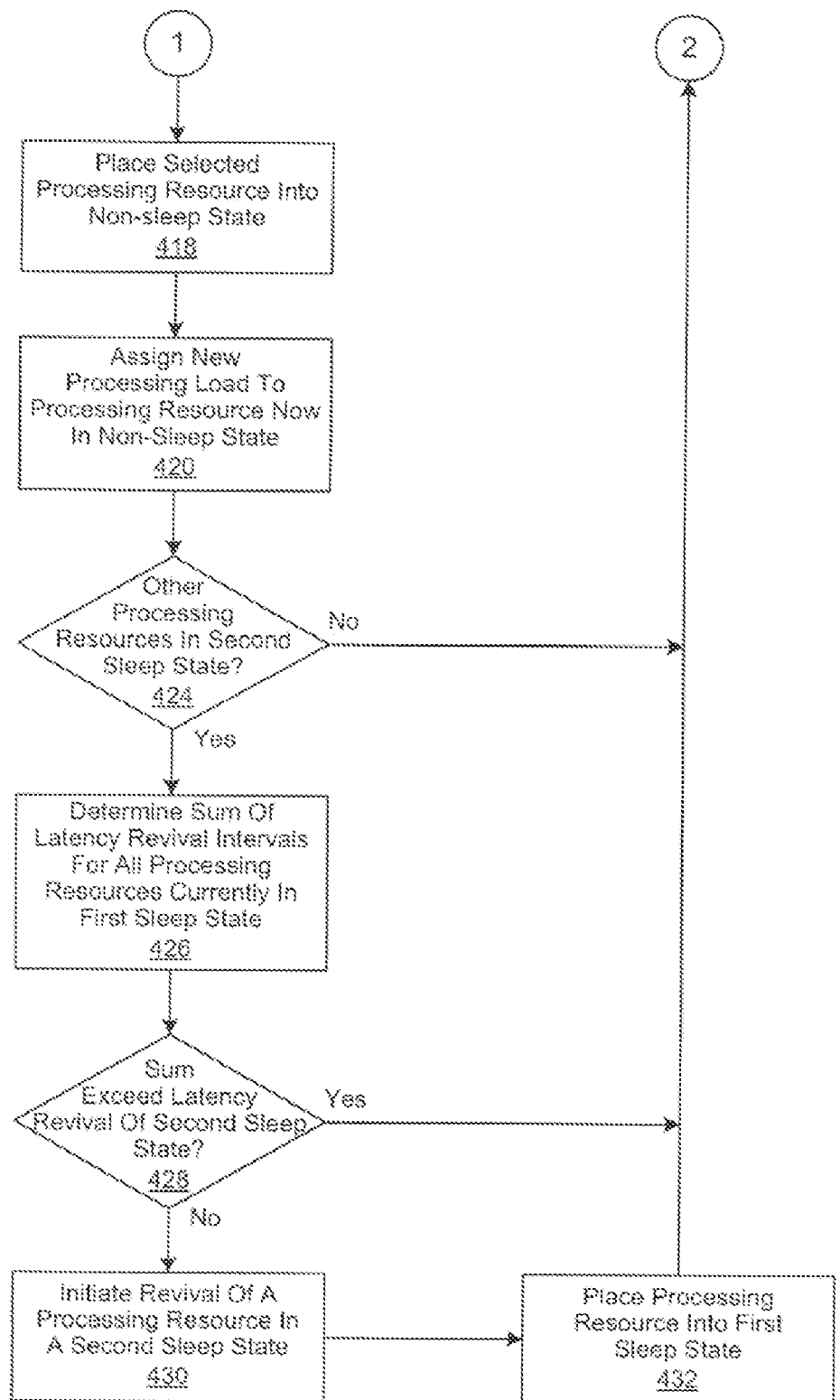

FIG. 4 is a simplified flowchart of the operation of a processing resource folding management module as implemented in accordance with an embodiment of the invention for unfolding operations. In this embodiment, unfolding management operations are begun in step 402, followed by the monitoring of processing loads assigned to a plurality of processing resources in step 404. A determination is then made in step 406 whether a new processing load is to be assigned to processing resource. If not, a determination is made in step 434 whether to continue folding management operations. If so, then the process is continued, proceeding with step 404. Otherwise unfolding management operations are ended in step 436.

However, if it is determined in step 406 that a new processing load is to be assigned to processing resource, then a determination is made in step 408 whether active processing resources are available for the new processing load. As an example, two processor cores may be in an active state, yet each is running at 60% capacity. If the new processing load is calculated to consume 20% of a processor core's capacity, then it can be assigned to either of the two processor cores. However, if the new processing load is calculated to consume 50% of a processor core's capacity, then neither of the two active processor cores are available to be used by the new processing load.

Accordingly, if it is determined in step 408 that active processing resources are available for the new processing load, then a processing resource is selected in step 410 for assignment of the new processing load, which is then assigned to the selected processing resource in step 412. The process is then continued, proceeding with step 434. However, if it is determined in step 408 that active processing resources are not available for the new processing load, then a determination is made in step 414 whether a processing resource in a first sleep state, comprising a first power consumption level and a first revival latency interval, is available. If not, then the process is then continued, proceeding with step 434.

However, if it is determined in step 414 that a processing resource in a first sleep state is available, then it is selected in step 416 and then placed into a non-sleep, or active, state in step 418. The new processing load is then assigned to the revived, or newly-active, processing resource in step 420. A determination is then made in step 424 whether other processing resources are in a second sleep state, comprising a second power consumption level and a second revival latency interval. If not, then the process is continued, proceeding with step 434. Otherwise, the sum of the respective revival latency intervals associated with all processing resources currently in the first sleep state is determined in step 426. A determination is then made in step 428 whether the sum exceeds the revival latency interval of the second sleep state. If so, then the process is continued, proceeding with step 434. Otherwise, a revival of a processing resource currently in the second sleep state is initiated in step 430 and then placed into the first sleep state in step 432. The process is then continued, proceeding with step 434.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of skill in the art without departing from the scope and spirit of the invention. The embodiment was chosen and described in order to best explain the principles of the invention and the practical application, and to enable others of skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A computer-implemented method for managing power consumption in an information processing system, comprising:
    monitoring a plurality of processing loads assigned to a corresponding plurality of processing resources operating in a non-sleep state;
    reassigning a first processing load assigned to a first processing resource to a second processing resource, wherein said second processing resource comprises a second processing load and a sum of said first and second processing loads does not exceed a capacity of said second processing resource, and said reassignment results in said first processing resource being idle;
    placing said first processing resource into a first sleep state comprising a first power conservation state and a first revival latency interval; and
    placing an individual said first processing resource in said first sleep state into a second sleep state comprising a second power conservation state and a second revival latency interval if said second revival latency interval exceeds the sum of said first revival latency intervals corresponding to a plurality of said first processing resources in said first sleep state.

2. The method of claim 1, further comprising:
    placing said individual first processing resource in said second sleep state into said first sleep state when said second revival latency interval exceeds the sum of said first revival latency intervals corresponding to a plurality of said first processing resources in said first sleep state.

3. The method of claim 1, further comprising:
placing said individual first processing resource in said first sleep state into said non-sleep state when said sum of first and second processing loads exceeds the capacity of said second processing resource; and
reassigning said first processing load assigned to said second processing resource to said individual first processing resource.

4. The method of claim 1, further comprising:
placing said individual first processing resource in said first sleep state into said non-sleep state when a third processing load is assigned to said second processing resource and the sum of said first, second, and third processing loads exceeds the capacity of said second processing resource; and
reassigning said third processing load assigned to said second processing resource to said individual first processing resource.

5. The method of claim 1, wherein said plurality of processing resources comprises a plurality of processors.

6. The method of claim 1, wherein said plurality of processing resources comprises a plurality of processors.

7. A system comprising:
a processor;
a data bus coupled to the processor; and
a non-transitory computer-usable medium embodying computer program code, the computer-usable medium being coupled to the data bus, the computer program code managing power consumption in an information processing system and comprising instructions executable by the processor and configured for:
monitoring a plurality of processing loads assigned to a corresponding plurality of processing resources operating in a non-sleep state;
reassigning a first processing load assigned to a first processing resource to a second processing resource, wherein said second processing resource comprises a second processing load and a sum of said first and second processing loads does not exceed a capacity of said second processing resource, and said reassignment results in said first processing resource being idle;
placing said first processing resource into a first sleep state comprising a first power conservation state and a first revival latency interval; and
placing an individual said first processing resource in said first sleep state into a second sleep state comprising a second power conservation state and a second revival latency interval if said second revival latency interval exceeds the sum of said first revival latency intervals corresponding to a plurality of said first processing resources in said first sleep state.

8. The system of claim 7, further comprising:
placing said individual first processing resource in said second sleep state into said first sleep state when said second revival latency interval exceeds the sum of said first revival latency intervals corresponding to a plurality of said first processing resources in said first sleep state.

9. The system of claim 7, further comprising:
placing said individual first processing resource in said first sleep state into said non-sleep state when said sum of first and second processing loads exceeds the capacity of said second processing resource; and
reassigning said first processing load assigned to said second processing resource to said individual first processing resource.

10. The system of claim 7, further comprising:
placing said individual first processing resource in said first sleep state into said non-sleep state when a third processing load is assigned to said second processing resource and the sum of said first, second, and third processing loads exceeds the capacity of said second processing resource; and
reassigning said third processing load assigned to said second processing resource to said individual first processing resource.

11. The system of claim 7, wherein said plurality of processing resources comprises a plurality of processors.

12. The system of claim 7, wherein said plurality of processing resources comprises a plurality of memory devices.

13. A non-transitory computer-usable medium embodying computer program code, the computer program code comprising computer executable instructions configured for:
monitoring a plurality of processing loads assigned to a corresponding plurality of processing resources operating in a non-sleep state;
reassigning a first processing load assigned to a first processing resource to a second processing resource, wherein said second processing resource comprises a second processing load and a sum of said first and second processing loads does not exceed a capacity of said second processing resource, and said reassignment results in said first processing resource being idle;
placing said first processing resource into a first sleep state comprising a first power conservation state and a first revival latency interval; and
placing an individual said first processing resource in said first sleep state into a second sleep state comprising a second power conservation state and a second revival latency interval if said second revival latency interval exceeds the sum of said first revival latency intervals corresponding to a plurality of said first processing resources in said first sleep state.

14. The computer usable medium of claim 13, further comprising:
placing said individual first processing resource in said second sleep state into said first sleep state when said second revival latency interval exceeds the sum of said first revival latency intervals corresponding to a plurality of said first processing resources in said first sleep state.

15. The computer usable medium of claim 13, further comprising:
placing said individual first processing resource in said first sleep state into said non-sleep state when said sum of first and second processing loads exceeds the capacity of said second processing resource; and
reassigning said first processing load assigned to said second processing resource to said individual first processing resource.

16. The computer usable medium of claim 13, further comprising:
placing said individual first processing resource in said first sleep state into said non-sleep state when a third processing load is assigned to said second processing resource and the sum of said first, second, and third processing loads exceeds the capacity of said second processing resource; and
reassigning said third processing load assigned to said second processing resource to said individual first processing resource.

17. The computer usable medium of claim 13, wherein said plurality of processing resources comprises a plurality of processors.

18. The computer usable medium of claim 13, wherein said plurality of processing resources comprises a plurality of processors.

19. The computer usable medium of claim 13, wherein the computer executable instructions are deployable to a client computer from a server at a remote location.

20. The computer usable medium of claim 13, wherein the computer executable instructions are provided by a service provider to a customer on an on-demand basis.

* * * * *